United States Patent Office 3,260,676
Patented July 12, 1966

3,260,676
CRACKING CATALYST DEMETALLIZATION
Robert L. Foster, Homewood, Ill., assignor to Sinclair Research, Inc., New York, N.Y., a corporation of Delaware
No Drawing. Filed Apr. 3, 1963, Ser. No. 270,199
16 Claims. (Cl. 252—411)

This application is a continuation-in-part of my copending application Serial No. 191,253, filed April 30, 1962, now abandoned.

This invention is a method for the removal of poisoning metals from synthetic gel, silica-based hydrocarbon conversion catalysts. The method is useful in conjunction with hydrocarbon conversion processes where the feed is contaminated with nickel and/or vanadium and comprises treating the catalyst, outside the conversion system, at relatively elevated temperatures with vapors having certain chemical and physical effects upon the poisoning metals, and treating the catalyst with an aqueous medium containing one or more solid ion exchange materials.

Where it is desired to remove nickel contaminants from the catalyst the method usually includes removing the catalyst containing metal contaminants from the hydrocarbon conversion system, sulfiding the catalyst, removing poisoning metal contaminants from the catalyst by the use of cation exchange resin and returning a catalyst, of reduced poisoning metals content, to hydrocarbon processing. Where it is desired to remove vanadium from the catalyst a treatment with molecular oxygen-containing gas may be performed instead of the sulfiding. Preferably, since the poisoned catalyst will ordinarily contain both of these harmful metals, the demetallization process of this invention produces especially superior results in removing both metals when the catalyst is given a high temperature treatment with molecular oxygen-containing gas before sulfiding. A chlorination treatment of the catalyst after sulfiding also may be employed to improve metal removal.

Catalytically promoted methods for the chemical conversion of hydrocarbons include cracking, hydrocracking, reforming, hydroforming, etc. Such reactions generally are performed at elevated temperatures, for example, about 900 to 1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750–1100° F., preferably about 850 to 950° F., at pressures up to about 200 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally-liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica-based or silica, e.g., silica-alumina, silica-magnesia, silica-zirconia, etc., compositions in a state of slight hydration and containing small amounts of acidic oxide promoters in many instances. The oxide catalyst ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason the use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be a mixture of two diverse synthetic gel materials, for example, where one material is coated with the other, or the catalyst may be partially of synthetic material, for example, a mixture of silica-alumina and clay, usually acid-treated clay, such as kaolinite or halloysite. The catalyst may comprise also a mixture or deposit of an alumina hydrate gel on various silica-alumina substrates, natural or synthetic. Such combined catalysts may have $Al_2O_3$ contents of from about 10–65% and often will have equal amounts of alumina and silica or equal amounts of silica-alumina gel and clay.

The physical form of the catalyst varies with the type of manipulative process to which it will be exposed. In a fixed-bed process, a series of catalytic reactors may be used, some being on-stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which may have no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators or by a gas lift. Generally these beads may range in size up to about ½" in diameter. When fresh, the minimum size bead is generally about ⅛". Other types of process use other forms of catalyst such as tablets or extruded pellets.

Of the various metals which are to be found in representative hydrocarbon feedstocks some, like the alkali metals, only deactivate the catalyst without changing the product distribution; therefore, they may be considered true poisons. Others, such as iron, nickel, vanadium and copper, markedly alter the selectivity and activity of cracking reactions if allowed to accumulate. A poisoned catalyst generally produces a higher yield of coke and hydrogen at the expense of desired products, such as gasoline and butanes. Since many cracking units are limited by coke burning or gas handling facilities, increased coke or gas yields require a reduction in conversion or throughput to stay within the unit capacity. For instance, it has been shown that the yield of butane, butylenes and gasoline dropped severely, at the same conversion level, in a commercial cracking of contaminated stocks when the nickel and vanadium content of the catalyst increased. Also, it has been shown that the yield of gasoline, based on feed disappearance, usually decreases when the laboratory-measured coke factor of a catalyst rises. This decreased gasoline yield is matched by an increase in gas as well as coke. If a poison is broadly defined as anything that deactivates or alters the reactions promoted by a catalyst, then all of these four metals can be considered poisons. It is hypothesized that these metals, when deposited on the surface of the cracking catalysts, superimpose their dehydrogenation activity on the cracking reactions and convert into carbonaceous residue and gas some of the material that would ordinarily go into gasoline. The relatively high content of hydrogen in the gases formed by metals-contaminated catalysts is evidence that dehydrogenation is being favored. This unwanted activity is especially great when nickel and vanadium are present in the feedstocks.

Refiners cope with the problem of metal poisoning by adopting several techniques. One technique includes selecting only feedstocks of low metal content or treating the feedstock to minimize its metal content. Another technique requires removing from the hydrocarbon conversion system of as much metal as is fed to it per unit time, in order to obtain and retain a total amount of metal in the system below a level where the conversion process is made economically unfeasible by the poisoning effect of the metal, which usually is proportional to the amount of metal on the catalyst.

In most conversion processes, some metal-containing catalyst is continually lost to the system in the form of fines which leave the system with effluent gases. The replacement of this loss with fresh unpoisoned catalyst reduces the net amount of metal in the system. In addition, the refiner usually will purposely remove enough poisoned catalyst from the system per unit time so that replacement with unpoisoned or less poisoned catalyst will keep the metal level at the desired equilibrium. The removed catalyst is usually discarded as a waste material; however, this invention provides a method wherein the catalyst may be demetallized and returned to the system.

Commercially used cracking catalysts are the result of years of study and research into the nature of cracking catalysis, and the cost of these catalysts is significant. The expense of such catalysts, however, is justified because the composition, structure, porosity and other characteristics of such catalysts are rigidly controlled so that they may give optimum results in cracking. It is important, therefore, that removing poisoning metals from the catalyst does not jeopardize the desired chemical and physical constitution of the catalyst. Although methods have been suggested in the past for removing poisoning metals from a catalyst which has been used for high temperature hydrocarbon conversions, for example, the processes of U.S. Patents 2,481,253, 2,488,718, 2,488,744, 2,668,798 and 2,693,455, the process of this invention is effective to remove metals without endangering the expensive catalyst. Thus, this invention permits a saving in catalyst cost where commercially-used contaminated stocks are processed, and further, makes possible the economic use of much lower-grade, highly poisoned feedstocks which usually are considered less desirable to use in cracking operations, even though they may be in plentiful supply, because of their tendency to damage the expensive catalysts.

The process of this invention comprises reactivating a silica-based, synthetic gel cracking catalyst poisoned with vanadium or nickel individually or together, by use in cracking a feedstock containing these metals as natural or "tramp" impurities, with a gaseous agent at elevated temperatures and subjecting the catalyst to aqueous contact with a solid cation exchange material for removal of the metal poisons.

Removal of metal poisons from a catalyst by use of an ion-exchange material is described in British Patent 880,622. It has been found, however, that certain vapor treatments of the catalyst before this aqueous treatment provides much greater efficiency to this later step in metal removal. Prior to reusing the catalyst it can be calcined, say at temperatures usually in the range of about 700 to 1100° F., conveniently by addition to the cracking unit catalyst regenerator.

In this invention, the hydrocarbon petroleum oils utilized as feedstock for a conversion process may be of any desired type normally utilized in catalytic conversion operations, and may contain much higher amounts of poisoning metals than formerly were considered tolerable. The feedstock sometimes has as much as 300 p.p.m. metal poisons and the catalyst may be used as a fixed, moving or fluidized bed or may be in a more dispersed state. For typical operations, the catalytic cracking of the hydrocarbon feed would normally result in a conversion of about 50–60 percent of the feedstock into a product boiling in the gasoline boiling range.

The cracking procedure of this invention generally includes a regeneration step for burning carbon off the catalyst. It will be understood that in this specification and claims "regeneration" refers to this carbon burn-off procedure. After regeneration, subjecting the poisoned catalyst sample to magnetic flux may be found desirable to remove any tramp iron particles which may have become mixed with the catalyst. Regeneration of a catalyst to remove carbon is a relatively quick procedure in most commercial catalytic conversion operations. For example, in a typical fluidized cracking unit, a portion of catalyst is continually being removed from the reactor and sent to the regenerator for contact with air at about 950 to 1200° F., more usually about 1000 to 1150° F. Combustion of coke from the catalyst is rapid, and for reasons of economy only enough air is used to supply the needed oxygen. Average residence time for a portion of catalyst in the regenerator may be of the order of about six minutes and the oxygen content of the effluent gases from the regenerator is desirably less than about ½%. The regeneration of any particular quantum of catalyst is generally regulated to give a carbon content of less than about 5.0%, generally less than about 0.5%. Regeneration puts the catalyst into a substantially carbon-free state, that is, a state where little, if any carbon is burned or oxygen consumed even when the catalyst is contacted with oxygen at temperatures conductive to combustion.

Treatment of the regenerated catalyst with molecular oxygen-containing gas is employed to improve the ion-exchange removal of vanadium from the poisoned catalyst. This treatment may be as described in copending application Serial No. 19,313, filed April 1, 1960, now abandoned, where the oxygen-containing gas contact is preferably performed at a temperature at least about 50° F. higher than the regeneration temperature, that is, the average temperature at which the major portion of carbon is removed from the catalyst. Copending Disegna and Foster application Serial No. 247,509, filed December 27, 1962, and incorporated herein by reference, describes a method wherein nitrogen oxide promoters are used in this vapor treatment. When such promoters are used, temperatures of about 600–1300° F., preferably about 800–1100° F., are found to be sufficient for the oxygen-containing gas contact. Temperatures up to those employed in the absence of promoters may be used with promoted gas streams but this may be less advantageous. Without a promoter, the temperature of treatment with molecular oxygen-containing gas will generally be in the range of about 1000 to 1800° F. but below a temperature where the catalyst undergoes any substantial deleterious change in its physical or chemical characteristics, preferably a temperature of about 1150 to 1350° or even as high as 1600° F. The duration of the oxygen treatment and the amount of vanadium prepared by the treatment for subsequent removal is dependent upon the temperature and the characteristics of the equipment used. If any significant amount of carbon is present in the catalyst at the start of this high temperature treatment, the essential oxygen contact is that continued after carbon removal, which may vary from the short time necessary to produce an observable effect in the later treatment, say a quarter of an hour, to a time just long enough not to damage the catalyst. In any event, after carbon removal, the oxygen treatment of the essentially carbon-free catalyst is at least long enough to stabilize a substantial amount of vanadium in its highest valence state at the catalyst surface, as evidenced by a significant increase, say at least about 10%, preferably at least about 100%, in the vanadium removal in subsequent stages of the process. This increase is over and above that which would have been obtained by the other metals removal steps without the oxygen treatment. The maximum practical time of treatment will often vary from about 4 to 24 hours, depending on the type of equipment used. The oxygen-containing gas used in the treatment contains molecular oxygen as the essential active ingredient and there is usually little significant consumption of oxygen in the treatment. The gas may be oxygen, or a mixture of oxygen with inert gas, such as air or oxygen-enriched air, containing at least about 1%, preferably at least about 10% $O_2$. The partial pressure of oxygen in the treating gas may range widely, for example, from about 0.1 to 30 atmospheres, but usually the total gas pressure will not exceed about 25 atmospheres. A promoting oxide of nitrogen may be provided, for instance, by premixing the molecular oxygen-containing gas with an oxide of nitrogen such as $N_2O$, NO, $N_2O_3$, $N_2O_5$, $NO_3$ and mixtures of the same. Preferably $NO_2$ is used, for its ease of manufacture and storage stability. The promoter is generally used in an amount sufficient to provide at least about 0.1% of the promoter, by weight of the catalyst, during the effective part of the oxygen treatment. At least about 0.2 is preferred and the upper limit of nitrogen oxide promoter content will ordinarily be determined by economic considerations; it usually need be no more than about 1%, although amounts up to 10%, 20%, or even more may be used.

The sulfiding step can be performed by contacting the poisoned catalyst with elemental sulfur vapors, or more conveniently by contacting the poisoned catalyst with a volatile sulfide, such as $H_2S$, $CS_2$ or a mercaptan. The contact with the sulfur-containing vapor can be performed at an elevated temperature, generally in the range of about 500 to 1500° F., preferably about 800 to 1300° F. Other treating conditions can include a sulfur-containing vapor partial pressure of about 0.1 to 30 atmospheres or more, preferably about 0.5 to 25 atmospheres. Hydrogen sulfide is the preferred sulfiding agent. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run for, say up to about 20 hours or more depending on these conditions and the severity of the poisoning. Temperatures of about 900 to 1200° F. and pressures approximating 1 atmosphere or less seem near optimum for sulfiding and this treatment often continues for a time sufficient to improve nickel removal, usually at least about 0.25, 1 or 2 hours but the time, of course, can depend upon the manner of contacting the catalyst and sulfiding agent and the nature of the treating system, e.g. batch or continuous, as well as the rate of diffusion within the catalyst matrix. The time of sulfiding is usually continued until an increase of at least about 100%, preferably at least about 300% in nickel removal from the catalyst is observed during subsequent treatments, as compared with that removed by the process in the absence of sulfiding. The sulfiding step performs the function not only of supplying a sulfur-containing metal compound easily susceptible to removal in later steps but appears to concentrate some metal poisons, notably nickel, at the surface of the catalyst. After sulfiding, the catalyst particles are mixed with sufficient water to form a suspension and the suspension is treated with solid particles of the ion-exchange material. Preferably, the suspension contains about 1 to 20 percent catalyst and is in a readily pumpable state. The water employed is preferably distilled or deionized water.

Among the ion exchange materials which may be used are relatively high molecular weight, water-insoluble, solid resins or carbonaceous materials containing an acidic functional group, for example, $CO_2H$ or $SO_3H$, or a plurality of such groups. These catalysts are exemplified by the sulfonated coals (Zeo-Karb H, Nalcite X, and Nalcite AX) produced by the treatment of bituminous coals with sulfuric acid, and commercially marketed as zeolitic water softeners or base exchangers. These materials are usually available in a neutralized form, and for use in this invention generally are activated to the hydrogen form by treatment with a mineral acid, such as hydrochloric acid, and water-washed to remove sodium and chloride ions prior to use. Sulfonated resin-type catalysts include the reaction products of phenol-formaldehyde resins with sulfuric acid (Amberlite IR-1, Amberlite IR-100, and Nalcite MX). Also useful are the sulfonated resinous polymers of coumarone-indene with cyclopentadiene, sulfonated polymers of coumarone-indene with furfural, sulfonated polymers of coumarone-indene with cyclopentadiene and furfural and sulfonated polymers of cyclopentadiene with furfural. The preferred cationic exchange resin is a strongly acidic exchange resin consisting essentially of a sulfonated polystyrene resin, for instance a divinylbenzene cross-linked polystyrene matrix having about 0.5 to 20%, preferably about 4 to 16%, divinylbenzene therein, to which are attached ionizable or functional nuclear sulfonic acid groups. This resin is manufactured and sold commercially under various tradenames, e.g., Dowex 50, Nalcite HCR and Permutit Q. Synthetic or natural zeolites may be used instead of the above mentioned cation exchange resins but generally will not be as effective as the synthetic resin types. It is preferable that the resin be wetted with water prior to use.

The ion exchange material is generally provided in a size distinct from the size of the catalyst particles so that the two kinds of particles may be separated by simple methods such as screening. It has been found that the particles of catalyst in the aqueous suspension may readily be separated from the particles of ion exchange material if the particle size of the catalyst is such that it will pass through a 100 mesh U.S. Standard Sieve screen and the particles of the ion exchange material are of 20 to 40 mesh U.S.S.S. screen. Thus, the aqueous suspension of catalyst particles may be passed upwardly through a column of ion exchange particles which are held in check from upward movement by a screen that has openings small enough to retain the ion exchange particles, but large enough to allow free passage of the catalyst particles in suspension. Upward flow of the said suspension through the ion exchange particles is preferred to a downward flow of the said suspension through a bed of ion exchange material since with the latter the bed of ion exchange material performs as a filter bed and will soon plug with the retained particles of catalyst. In the upflow method the movement of the water suspends and separates the particles of ion exchange material such that the suspension passes through the resin bed without any filtering action.

Instead of passing the suspension in a continuous stream through the ion exchange particles, a semi-continuous process may be used wherein the suspension is added to a vessel containing an ion exchange material and the mixture is agitated. After separating the suspension from the ion exchange material in a first vessel it may be added to a second vessel of ion exchange material and the process repeated for as many times as may be required to remove the impurities. A further alternative method involves simple batch treatment wherein a catalyst aqueous suspension is mixed with an ion exchange material, the mixture thoroughly agitated and thereafter separated.

It is preferable to have the catalyst particles smaller than the particles of ion exchange material though if the catalyst particles are larger than the particles of the ion exchange material, the two materials may be separated equally as readily as in the reverse situation. Manufacturers of ion exchange resins usually produce such material in the form of granules which range between 20 and 40 mesh with a few instances where the granules are of somewhat larger size than 20 mesh. Hence, this is the preferred range of particle size for the ion exchange material since it will permit separation of the particles of catalyst from the ion exchange material, while at the same time giving efficient metal removal.

The contact with ion-exchange material may take place in a slurry or suspension containing a total of about 5 to 40% solids. The pH of the slurry is of some significance, metal removal usually being improved at a pH below about 5, although at very low pH values there may be some attack on the alumina component of the catalyst itself. Generally a pH of about 1.3 to 4.5 is used and a preferred lower pH is 2.7. Mineral acids, such as sulfuric acid and, where needed, bases, such as ammonium hydroxide, may be used for pH adjustment, but organic acids and bases also may be employed. Preferably an acid or base is used which will not leave harmful materials on the catalyst. Also, the chlorine or other pretreatment agents entrained in the catalyst may serve partially or fully to bring the slurry to the desired pH. The temperature of the ion exchange treatment may range from room temperature to the temperature at which the exchange resins disintegrate. Certain resins are stable up to 250° F., while others should not be used at temperatures above 120° F. In any event, however, the upper temperature is limited only by the temperature at which the particular type of ion exchange material employed disintegrates. Since the expense of pressurized equipment is best avoided, temperatures of about 40 to 200° F. are generally used and about 60 to 100° F. is preferred. The slurry of catalyst in the aqueous medium may be brought to this temperature by the heat imparted to the solution by the hot catalyst following its oxygen or sulfiding vapor treatment. The time required for effective removal of metals is generally dependent on the temperature of the treatment, higher temperatures requiring less time. Times ranging from less than an hour, e.g., about 0.25 hour up to about 24 hours are practical although most of the demetallization appears to occur within the first few hours.

As mentioned, oxygen treatment is employed to improve vanadium removal by the ion-exchange material slurry while sulfiding is particularly useful for nickel removal from the catalyst, although it may also improve vanadium removal somewhat, also. When both pretreatments are employed to secure greater removal of both metals, the oxygen treatment usually precedes the sulfiding.

After the sulfiding, the catalyst may be treated by one or more procedures which tend to increase the aqueous dispersibility, for example, the solubility, of the metal poisons. Submission of the catalyst to an oxidation treatment has this effect and the treatment may comprise contacting of the slurry with an aqueous oxidizing medium, for example a solution of hydrogen peroxide. Chlorination of the sulfided catalyst also has the effect of improving the solubility of poisoning metals, which leads to improved metal removal. Such chlorination may be performed by contact of the poisoned catalyst with elemental chlorine vapors at a temperature from about room temperature to 900° F., preferably about 400–650° F. preferably without substantial volatization of chlorides. The chlorination, even at a low temperature, substantially improves the effectiveness of the ion exchange treatment. The contact with chlorine may be at atmospheric pressure, or below or above. Subatmospheric pressures may be achieved by the use of vacuum or preferably by dilution with inert gas such as nitrogen or flue gas. Generally at whatever pressure is used, at least about 0.5 or 1 weight percent chlorine, based on the catalyst, is employed. The upper limit is based on economics; no reason has been found to use more than about 10% chlorine, but 25% or more could be used. The time of contact, of course, depends on the amount of chlorine supplied per unit time and is sufficient to give conversion of substantial nickel to nickel chloride and to substantially improve the effect of the ion-exchange treatment on other poisoning metals. 15 minutes to 2 hours is a practical time range but the chlorination may be accomplished in 5 minutes or may take 5 or more hours. The contact with chlorine may be followed by a purge with an inert gas such as nitrogen or flue gas to remove entrained chlorine.

The chlorine is usually essentially anhydrous, that is, it has no separate water phase when in liquid form. As the amount of water in the chlorine increases, additional time and/or chlorine may be required to obtain a given amount of metal removal, probably due to decomposition of some of the chlorine by water, producing HCl. This harmful effect is also evident when water is present in the catalyst, so that it is preferred that the catalyst contain less than about 1 or 2% matter volatile at 1000° C. As mentioned, chlorination, when used, will precede the ion exchange treatment and after the exchange treatment the catalyst is conducted to a conversion system, although it may be desirable first to dry the catalyst filter cake or filter cake slurry at, say, 250 to 450° F., and also, prior to reusing the catalyst in the conversion operation, it can be calcined, say at temperatures usually in the range of about 700 to 1100° F.

In the treatment to take poisoning metals from the cracking catalyst the amount of metal is removed which is necessary to keep the average metal content of the catalyst in the cracking system below the limit of the unit's tolerance for poison. This tolerance of the cracker for poison determines to a large extent the amount of metals removed in the catalyst demetallization procedure. Where the catalyst contains a greater amount of poisoning metal, a particular treatment will remove a greater amount of metal; for example, if the cracker can tolerate an average of 100 p.p.m. Ni and the demetallization process can remove 50% of the nickel content of the catalyst, only 50 p.p.m. of nickel can be removed in a pass through the catalyst demetallization system. However, where the cracker can tolerate 500 p.p.m. of nickel, it is possible to remove 250 p.p.m. nickel from the catalyst with each pass through the demetallization system.

In the treatment to take poisoning metals from the cracking catalyst a large or small amount of metal can be removed as desired. The demetallization treatment generally removes about 10 to 90% of one or more poisoning metals from a catalyst portion which passes through the treatment. The demetallization system of this invention may conveniently remove about 40 to 80% nickel and 20–40% vanadium from the treated portion of catalyst. Preferably at least 50% of the equilibrium nickel content and 20% of the equilibrium vanadium content are removed by employment of the oxygen and sulfiding treatments. The actual time or extent of treating depends on various factors, and is controlled by the operator according to the situation he faces, e.g., the extent of metals content in the feed, the level of conversion unit tolerance for poison, the sensitivity of the particular catalyst toward a particular phase of the demetallization procedure, etc., Also, the thoroughness of treatment of any quantum of catalyst in commercial practice is balanced against the demetallization rate chosen; that is, the amount of catalyst, as compared to the total catalyst in the conversion system proper, which is subjected to the demetallization treatment per unit of time. A high rate of catalyst withdrawal from the conversion system and quick passage through a mild demetallization procedure may suffice as readily as a more intensive demetallization at a slower rate to keep the total of poisoning metal in the conversion reactor within the tolerance of the unit for poison. In a continuous operation of the commercial type a satisfactory treating rate may be about 5 to 50% of the total catalyst inventory in the system, per twenty-four hour day of operation although other treating rates may be used. With a continuously circulating catalyst stream, such as in the ordinary "fluid" system a slip-stream of catalyst, at the "equilibrium" level of poisoning metals may be removed intermittently or continuously from the regenerator standpipe or other points in the cracking system. The catalyst to be treated may be removed from the hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. poisoning metal will be accumulated on the catalyst before demetallization is warranted. A suitable amount, generally a very small portion of the catalyst, is removed from the hydrocarbon conversion system and treated, usually after the oxidation regeneration which serves to remove carbonaceous deposits. With a continuously circulating catalyst stream, such as in the ordinary "fluid" system this may conveniently be done by the intermittent or continuous removal of a slip-stream of catalyst from the regenerator standpipe. The severity of regeneration is generally such that the catalyst sent to demetallization contains not more than about 0.5% carbon. Then the catalyst of the slip stream can be heated in air to the temperature and for the length of time found to be sufficient for vanadium removal without catalyst damage, and subsequently maintained in a hydrogen sulfide or hydrogen sulfide-inert gas mixture for one to three hours at temperatures approximating 1050° F. The sulfiding gas may be purged from the catalyst with an inert gas, perhaps at a cooler temperature, slurried with water and treated with the ion exchanger. The treated catalyst can be returned to the unit, for example, to the regenerator, reducing greatly the new catalyst requirement. The apparatus used to perform the process of the invention may be suitable for conducting part or all of the procedures with fluidized beds of finely divided catalyst in the various operations.

The following examples are illustrative of the invention but should not be considered limiting.

*Example I*

A batch of regenerated catalyst was obtained which had been poisoned with metal contaminants from use in a commercial catalytic cracking unit using conventional fluidized catalyst techniques, including cracking and air regeneration at about 1100° F., to convert a feedstock (A) comprising a blend of Wyoming and Mid-Continent gas oils containing about 1.2 p.p.m. vanadium, about 0.3 p.p.m. nickel, about 1.0 p.p.m. iron and about 2 weight percent sulfur. This gas oil blend had a gravity (API) of 24°, a carbon residue of about 0.3 weight percent and a boiling range of about 500 to 1000° F. The base catalyst was a synthetic-gel type cracking catalyst containing about 25% $Al_2O_3$, the balance silica.

A portion of this regenerated catalyst was slurried with a Dowex 50×16 water-washed resin in the hydrogen form. This resin is a sulfonated polystyrene resin containing 16% divinylbenzene as the cross-linking group. The resulting aqueous suspension contained about 20% catalyst and an equal weight of resin and had a pH of about 3.7. The suspension was held at about 175° F. for three hours and then the catalyst was separated out, dried and analyzed for metal content. The results are given in the table under Run E.

Another portion (D) of the base catalyst was treated identically as sample E except that before ion-exchange contact it was held in a fluidized bed in contact with air for 4 hours at 1300° F. Sample C likewise was held in air at 1300° F., but for two hours, and also was treated with $H_2S$ for one hour at 1175° F. before ion exchange treatment. Sample F was sulfided with $H_2S$ for 1½ hours at 1150° F. before ion exchange treatment. Sample G was a portion of sample C which was treated with chlorine gas for 10 minutes at 600° F. before a 10 minute resin treatment at 75° F. The pH of the resin-catalyst slurry at the end of the treatment and the results of the treatments are given in table below.

| Run | Base | E | D | F | C | G |
|---|---|---|---|---|---|---|
| $O_2$ treatment, °F | | | 1,300 | | 1,300 | 1,300 |
| $H_2S$ treatment, °F | | | | 1,150 | 1,175 | 1,175 |
| $Cl_2$ treatment, °F | | | | | | 600 |
| Resin slurry: | | | | | | |
| pH | | 3.9 | 3.5 | 3.5 | 3.8 | 1.6 |
| Time (hrs.) | | 3 | 3 | 3 | 3 | 1/6 |
| Temp. (°F.) | | 170 | 170 | 170 | 170 | 75 |
| Metal level: | | | | | | |
| NiO (p.p.m.) | 327 | 301 | 278 | 151 | 100 | 70 |
| $V_2O_5$ (p.p.m.) | 4,240 | 3,730 | 3,337 | 3,172 | 2,667 | 3,098 |
| Fe (percent) | 0.270 | 0.232 | 0.217 | 0.189 | 0.171 | 0.231 |
| Percent Metal Removal: | | | | | | |
| Ni | | 8 | 15 | 54 | 69 | 75 |
| V | | 12 | 21 | 25 | 38 | 28 |
| Fe | | 14 | 20 | 30 | 39 | 17 |
| Test Cracking: | | | | | | |
| Relative Activity | 39.1 | 41.5 | | 41.0 | 45.7 | 42.0 |
| Distillate and Loss | 35.4 | 36.6 | | 36.2 | 38.5 | 36.8 |
| Gas Factor | 1.44 | 1.33 | | 1.29 | 1.19 | 1.21 |
| Coke Factor | 1.11 | 0.95 | | 0.95 | 0.86 | 0.84 |
| Gas Gravity | 1.16 | 1.20 | | 1.23 | 1.29 | 1.30 |

Clearly, these results show the surprisingly improved metals removal obtainable by ion-exchange treatment of a poisoned conversion catalyst brought about by preliminary oxygen and/or sulfiding treatment with or without chlorination treatment.

It is claimed:

1. A method for removing nickel from a synthetic gel, silica-based cracking catalyst which has been poisoned by contamination with nickel due to use of said catalyst in cracking at elevated temperature, to gasoline, a hydrocarbon feedstock higher boiling than gasoline and containing nickel, said cracking including a catalytic cracking zone and a catalyst regeneration zone between which the catalyst is cycled and in which cracking zone the catalyst becomes contaminated with nickel of said hydrocarbon feedstock and in which regeneration zone carbon is oxidized at an elevated temperature and thereby removed from the catalyst, consisting essentially of bleeding a portion of the nickel-contaminated catalyst from the cracking system, contacting bled catalyst with a sulfiding vapor at about 500° to 1500° F. to enhance subsequent nickel removal, contacting said sulfided catalyst in an aqueous medium with a solid cation exchange material to remove nickel from the catalyst, separating the catalyst from the cation exchange material and passing resulting demetallized catalyst to a hydrocarbon cracking system.

2. The method of claim 1 in which the catalyst is a silica-alumina cracking catalyst.

3. The method of claim 1 in which the sulfiding vapor is hydrogen sulfide and sulfiding is at a temperature of about 900 to 1200° F. and an $H_2S$ pressure of about 0.5–25 atmospheres.

4. A method for removing vanadium from a synthetic gel, silica-based cracking catalyst which has been poisoned by contamination with vanadium due to the use of said catalyst in cracking, at elevated temperature, to gasoline, a hydrocarbon feedstock higher boiling than gasoline and containing vanadium, the cracking system comprising a catalytic cracking zone and a catalyst regeneration zone between which the catalyst is cycled and in which cracking zone catalyst becomes contaminated with vanadium of said hydrocarbon feedstock, and in which regeneration zone carbon is oxidized at an elevated temperature and thereby removed from the catalyst, consisting essentially of bleeding from the cracking system a portion of the vanadium-contaminated catalyst, contacting bled, substantially carbon-free catalyst for at least about 15 minutes with a gas containing molecular oxygen at a temperature of at least about 600° F. and sufficient to enhance subsequent vanadium removal, but below a temperature deleterious to the catalyst to increase subsequent vanadium removal from said catalyst, contacting the catalyst in an aqueous medium with a solid cation exchange material, separating catalyst from the cation exchange material, and passing resulting devanadized catalyst to a hydrocarbon cracking system.

5. The method of claim 4 in which the catalyst is a silica-alumina cracking catalyst.

6. The method of claim 4 in which the gas containing molecular oxygen also contains an oxide of nitrogen.

7. The method of claim 4 in which the oxygen containing gas is air at a temperature of at least 1150° F.

8. A method for removing metal poisons from a synthetic gel, silica-based cracking catalyst which has been poisoned by contamination with nickel and vanadium due to use of said catalyst in cracking at elevated temperature, to gasoline, a hydrocarbon feedstock higher boiling than gasoline containing said poisoning metals, the cracking system comprising a catalytic cracking zone and a catalyst regeneration zone between which the catalyst is cycled and in which cracking zone catalyst becomes contaminated with said poisoning metals of said hydrocarbon feedstock, and in which regeneration zone carbon is oxidized at an elevated temperature and thereby removed from the catalyst, consisting essentially of bleeding from the cracking system a portion of the metal-contaminated catalyst, contacting bled, substantially carbon-free catalyst for at least about 15 minutes with a gas containing molecular oxygen at a temperature of at least about 600° F. and sufficient to enhance subsequent vanadium removal, but below a temperature deleterious to the catalyst to increase subsequent vanadium removal from said catalyst, sulfiding oxygen-containing gas-treated catalyst by contact with a sulfiding vapor at a temperature of about 500° to 1500° F. to enhance subsequent nickel removal, contacting the catalyst with an aqueous slurry of a cation exchange material, separating catalyst from the slurry and passing resulting demetallized catalyst to a hydrocarbon cracking system.

9. The method of claim 8 in which the catalyst is a silica-alumina catalyst.

10. The method of claim 8 in which the pH of the slurry of catalyst and cation exchange material is about 1.3 to 4.5.

11. The method of claim 8 in which the catalyst is treated with a chlorinating agent subsequent to sulfiding and prior to contact with the solid cation exchange material.

12. The method of claim 11 in which the catalyst is silica-alumina.

13. The method of claim 8 in which the oxygen-containing gas contact is at a temperature of at least 1150° F.

14. A method for removing nickel and vanadium from a synthetic gel, silica-based cracking catalyst which has been poisoned by contamination with said metals due to use of said catalyst in cracking at elevated temperature, to gasoline, a hydrocarbon feedstock higher boiling than gasoline and containing said poisoning metals, the cracking system comprising a catalytic cracking zone and a catalyst regeneration zone between which the catalyst is cycled and in which cracking zone the catalyst becomes contaminated with said contaminant of said hydrocarbon feedstock, and in which regeneration zone carbon is oxidized at an elevated temperature and thereby removed from the catalyst, the steps which comprise bleeding from the cracking system a portion of the metal contaminated catalyst, containing less than about 10,000 p.p.m. poisoning metals measured as the common oxides, contacting bled, substantially carbon-free catalyst for at least about 15 minutes with a gas containing molecular oxygen at a temperature of at least about 1150° F., but below a temperature deleterious to the catalyst to increase subsequent vanadium removal from said catalyst, sulfiding oxygen-containing gas-treated catalyst by preliminary contact with hydrogen sulfide at a temperature of about 800° to 1300° F. to increase subsequent nickel removal from said catalyst, contacting said catalyst with an aqueous suspension of a cation exchange material having a pH of about 1.3 to 4.5, separating catalyst from the slurry and passing to a hydrocarbon cracking system the resulting demetallized catalyst without undue deleterious change in its physical and chemical characteristics.

15. The method of claim 14 in which the catalyst is silica-alumina.

16. A method for removing nickel and vanadium from a synthetic gel, silica-based cracking catalyst which has been poisoned by contamination with said metals due to use of said catalyst in cracking at elevated temperature, to gasoline, a hydrocarbon feedstock higher boiling than gasoline and containing said poisoning metal, the cracking system comprising a catalytic cracking zone and a catalyst regeneration zone between which the catalyst is cycled and in which cracking zone the catalyst becomes contaminated with said contaminant of said hydrocarbon feedstock, and in which regeneration zone carbon is oxidized at an elevated temperature and thereby removed from the catalyst, the steps which comprise bleeding from the cracking system a portion of the metal contaminated catalyst, containing less than about 10,000 p.p.m. poisoning metals measured as the common oxides, contacting bled, substantially carbon-free catalyst for at least about 15 minutes with a gas containing molecular oxygen and an oxide of nitrogen at a temperature of about 600–1300° F. to increase subsequent vanadium removal from said catalyst, sulfiding oxygen-containing gas-treated catalyst by preliminary contact with hydrogen sulfide at a temperature of about 800 to 1300° F. to increase subsequent nickel removal from said catalyst, contacting said catalyst with an aqueous suspension of a cation exchange material having a pH of about 1.3 to 4.5, separating catalyst from the slurry and passing to a hydrocarbon cracking system the resulting demetallized catalyst without undue deleterious change in its physical and chemical characteristics.

References Cited by the Examiner

UNITED STATES PATENTS

| | | | |
|---|---|---|---|
| 3,041,270 | 6/1962 | Leum et al. | 208—120 |
| 3,108,972 | 10/1963 | Retailliau | 252—412 |
| 3,123,548 | 3/1964 | Connor et al. | 252—411 |
| 3,147,209 | 9/1964 | Erickson et al. | 252—411 |

FOREIGN PATENTS 880,622 10/1961 Great Britain.

OSCAR R. VERTIZ, *Primary Examiner.*

MAURICE A. BRINDISI, *Examiner.*

R. D. EDMONDS, R. DAVIDSON, *Assistant Examiners.*